United States Patent [19]

Dettmann

[11] Patent Number: 4,534,539
[45] Date of Patent: Aug. 13, 1985

[54] PULSED MAGNETIC VALVE ASSEMBLY

[75] Inventor: Heinrich Dettmann, Niedernhall, Fed. Rep. of Germany

[73] Assignee: Bürkert GmbH, Fed. Rep. of Germany

[21] Appl. No.: 524,301

[22] Filed: Aug. 18, 1983

[30] Foreign Application Priority Data

Aug. 20, 1982 [EP] European Pat. Off. ........ 82107641.1

[51] Int. Cl.³ ............................................. F16K 31/08
[52] U.S. Cl. ..................................... 251/65; 335/229; 335/253
[58] Field of Search ................. 251/65, 130, 137, 129, 251/141, 139, 89; 137/625.65; 335/253, 254, 229

[56] References Cited

U.S. PATENT DOCUMENTS

| | | | |
|---|---|---|---|
| 2,435,425 | 2/1948 | Cunningham | 335/229 |
| 2,614,584 | 10/1952 | Goepfrich | 251/139 |
| 2,829,860 | 4/1958 | Garner et al. | 251/129 |
| 2,867,236 | 1/1959 | Klein | 251/137 |
| 3,022,450 | 2/1962 | Chase | 335/229 |
| 3,082,359 | 3/1963 | Mangiafico et al. | 251/141 |
| 3,331,042 | 7/1967 | Erickson et al. | 251/129 |
| 3,361,161 | 1/1968 | Schwartz | 251/65 |
| 3,379,214 | 4/1968 | Weinberg | 251/65 |
| 4,159,026 | 6/1979 | Williamson | 251/65 |
| 4,382,578 | 5/1983 | Ruyak | 251/65 |

FOREIGN PATENT DOCUMENTS

| | | | |
|---|---|---|---|
| 7607614 | 10/1977 | France | 335/229 |
| 876370 | 8/1961 | United Kingdom | 251/65 |

Primary Examiner—Samuel Scott
Assistant Examiner—Noah Kamen
Attorney, Agent, or Firm—Toren, McGeady, Stanger, Goldberg & Kiel

[57] ABSTRACT

A magnetically operated valve having a permanent magnet with constant remanence wherein the permanent magnet is formed with an annular configuration and is located in one end of a tubular core guide member which operates to guide a movable core member forming the valve body. The permanent magnet is produced from a rare earth/cobalt alloy and secures the valve in at least one of a plurality of switched positions and a ferromagnetic circuit is formed with sheet metal sheets extending to form the outer portion of the ferromagnetic circuit with the movable core member forming the inner part thereof. The permanent magnet is inserted in cutout portions of the sheet metal sheets which form the outer part of the ferromagnetic circuit.

3 Claims, 3 Drawing Figures

PULSED MAGNETIC VALVE ASSEMBLY

The present invention is directed to a pulsed magnetic valve assembly with permanent magnet support or retaining means without change of remanence wherein a permanent magnet for securing a valve body is produced from a rare earth/cobalt alloy and is attached in an outer ferromagnetic circuit in at least one of the switching positions and in which the inner part of the ferromagnetic circuit is formed by means of a movable core which is guided in a steel core tube and a stopper.

Pulsed magnetic valves of the type to which the present invention relates are known in the technical art. In known structural devices of this type, a permanent magnet is primarily attached in the inner ferromagnetic circuit. However, there are also known pulsed magnetic valves in which the permanent magnet is inserted in the outer ferromagnetic circuit and wherein the device is constructed in one piece in a conventional manner and is arranged as an extension or elongation of the armature thereby resulting in a corresponding extension of the valve. With respect to a valve not having a permanent magnet support, the total structure of such a valve changes with respect to the dimensional configuration and overall geometry so that individual parts of a corresponding valve without magnetic support may not be utilized for the otherwise identical valve having the magnetic support.

The present invention is directed toward providing a pulsed magnetic valve having a permanent magnet support without change of remanence which, in contrast to similar standardized compact magnetic valves without permanent magnet support, will enable the installation or insertion of a permanent magnet in the outer ferromagnetic circuit thereof without requiring change of the outer dimensioning and configuration of the corresponding magnetic valve without permanent magnet support, particularly the stopper and the magnetic core, so that substantial parts of the valve not equipped with a permanent magnet support may be utilized in the valve construction with the permanent magnet support. Also, in a normal embodiment in accordance with the invention, the structure may be converted to pulse execution by means of installation of a permanent magnet support which requires only slight modifications.

SUMMARY OF THE INVENTION

Briefly, the present invention may be described as a pulsed magnetic valve assembly having permanent magnet support means with constant remanence comprising: valve means adapted to be electromagnetically switched to a plurality of positions; electromagnetic means for operating said valve means, said valve means including a valve body forming a movable core member of said electromagnetic means; permanent magnet means produced from a rare earth/cobalt alloy for securing said valve means in at least one of said plurality of switched positions; a tubular core member for guiding said movable core member; a stopper member for limiting movement of said movable core member in one direction; and means forming a ferromagnetic circuit including sheet metal sheets having cutout portions forming an outer part of said ferromagnetic circuit with said movable core member forming an inner part of said ferromagnetic circuit; said permanent magnet means being constructed with an annular configuration located in one end of said tubular core guide member and inserted in said cutout portions of said sheet metal sheets which form said outer part of said ferromagnetic circuit.

Thus, advantages are achieved in accordance with the invention in that, in a pulsed magnetic valve assembly of the type described, the permanent magnet is constructed so as to be of an annular configuration and is placed outside on one end of the tubular core guide member, with the permanent magnet being inserted in cutout portions of the sheet metal sheets which form the outer portion of the ferromagnetic circuit of the assembly.

The annular construction of the permanent magnet and its placement on the outer end of the tubular core guide member enables incorporation of the permanent magnet into the assembly in a space saving and low cost construction requiring the lowest modification expenditures of elements of the outer ferromagnetic circuit which are present in standard valves. This simple conversion possibility also extends to the plurality of valves which, in known magnetic valves modular construction systems, are assembled with more or less uniform drive systems by means of combining a plurality of different valve housings with different core systems.

In accordance with a further development of the invention, the permanent magnet is divided into a plurality of individual magnet parts and the individual parts are placed on a pole sleeve. The pole sleeve is connected to form a unitary member with the individual magnets and with a magnet support which is preferably formed by injection plastic molding. The arrangement is formed so as to leave open the pole faces of the individual magnets and in the unit which is thus formed and which is placed on the one end of the tubular core guide member, the arrangement is such that it engages at this end of the valve housing in recessed portions of the sheet metal sheets of the outer ferromagnetic circuit.

The type of combination of the individual magnets and the pole sleeve carrying them by means of being embedded with plastic material, makes possible a more efficient preassembly of the permanent magnet module or subassembly and a low cost manner is provided for introducing this subassembly into the complete magnetic system. The permanent magnets which are structured in this manner may be employed in magnetic valves with angular sheet metal sheets being employed as the outer ferromagnetic circuit elements and with an epoxy resin coating being provided to form the assembly in the same manner as valves with conventional pot magnet structures wherein a level bottom plate of the outer ferromagnetic circuit is provided.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 2:
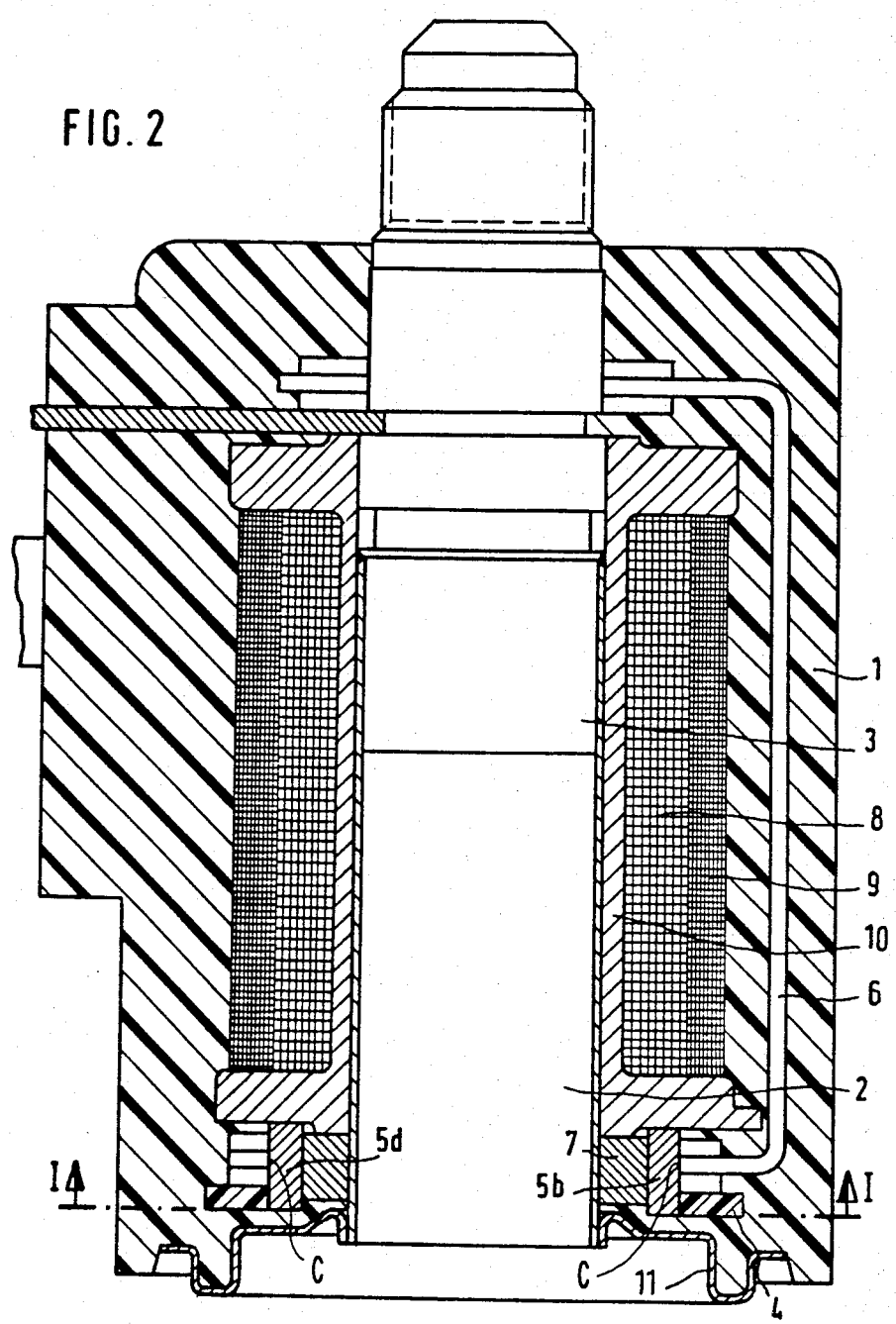
FIG. 2 is a longitudinal sectional view of a pulse coil of the type shown in FIG. 1.
Figure 3:
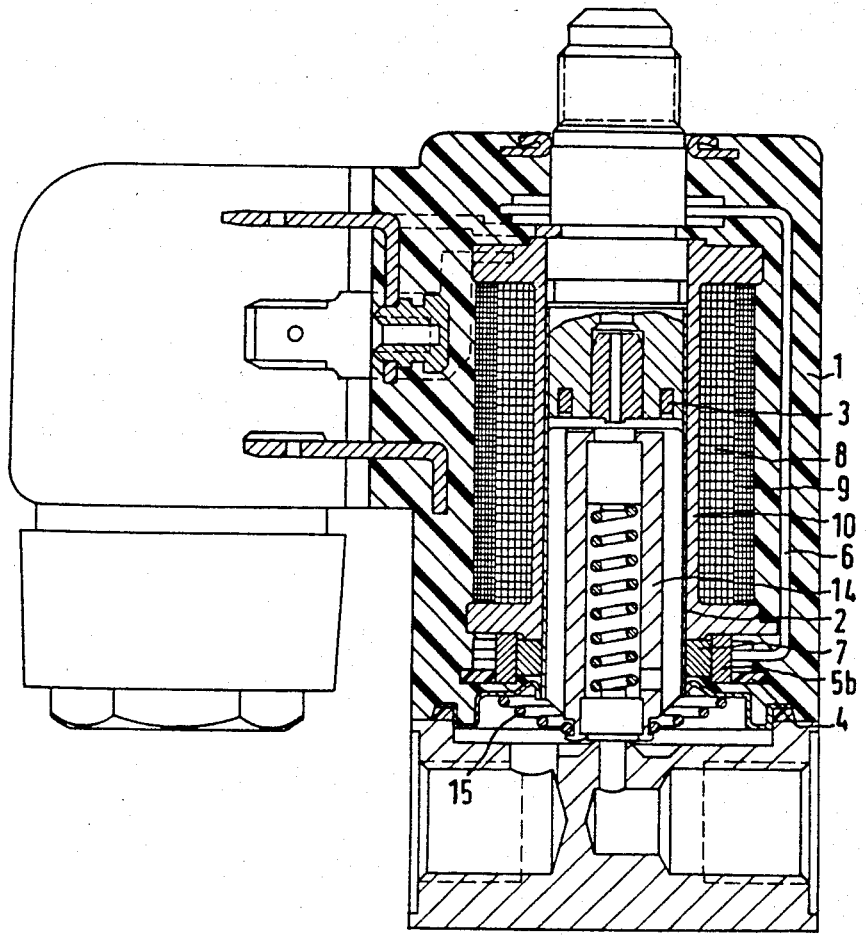
FIG. 3 is a sectional view taken through a valve assembly which is completed by employing the pulse coil shown in FIGS. 1 and 2.

Referring now to the drawings, the pulsed magnetic valve assembly of the invention is depicted as provided with a plastic material coating 1 which contains a steel tubular core guiding member 2 of a type which may be used in known valves without magnetic support and into whose upper part, as shown in FIGS. 2 and 3, a stopper 3 is inserted.

The tubular core guide 2 is arranged within a coil support body 10 upon which there is wound a coil assembly which includes a trip coil 8, which constitutes a starting, attraction or attachment winding, and a drop coil or winding 9. A combined valve body 14, which also simultaneously constitutes acts as the magnetic core of the electromagnetic assembly, is supported in a guided arrangement in the tubular core guide 2 and the valve body 14 is movable in a direction opposed to the magnetic action of the electromagnetic means by the action of a spring 15.

Figure 1:
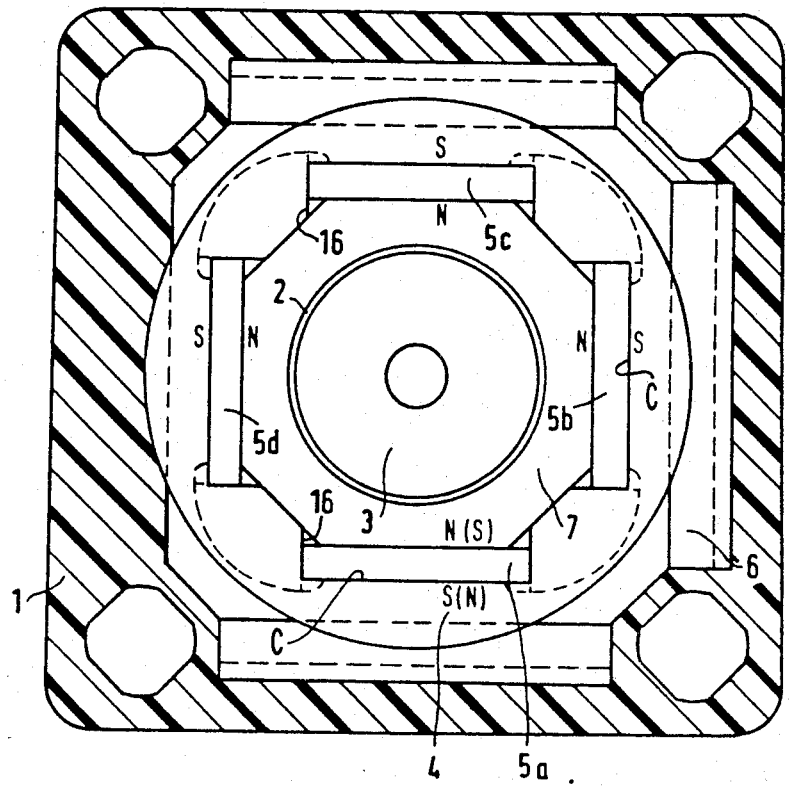
FIG. 1 is a sectional end view of the pulse coil of a pulsed magnetic valve structured in accordance with the invention.

The assembly of the invention includes permanent magnet means which, in the embodiment depicted, is divided into four individual magnets or permanent magnet parts 5a–5d, with the permanent magnet unit being placed in the lower part of the tubular core guide 2. The individual parts of the permanent magnet unit constitute generally rectangular small plates and they are composed, in a manner known to those skilled in the art, of a rare earth/cobalt alloy, for example of a samarium/cobalt alloy. The individual permanent magnet parts 5a–5d are inserted as indicated in FIG. 1 with their polarities arranged in the same direction as indicated by the designations N and S. Instead of placing all of the N-poles of the small plates inwardly and all of the S-poles outwardly, the plates may also be inserted with the S-poles directed inwardly and the N-poles directed outwardly. The correct insertion of the plates during assembly will be ensured by means of markers or the like, for example by means of color markers, which will assist the assembly procedure.

The small plates constituting the individual permanent magnet parts 5a–5d are supported at a pole sleeve 7. The bearing surfaces extend along larger parts of the circumference of the pole sleeve than the likewise flattened surfaces remaining open between the bearing surfaces. Instead of bearing surfaces formed by means of flattened portions, physical poles in the form of projection shoulders could also be provided at the pole sleeve, on which physical poles the permanent magnet plates 5a–5d would be placed. The pole sleeve 7 with the individual magnets 5a–5d is supported in a magnet support 4 in the example depicted in the drawings. This magnet support constitutes a ring produced from plastic material such as, for example, Ultramid and it has shoulders 16 at which individual magnets 5a–5d contact or are supported with their end faces.

The assembly of the invention is formed with a ferromagnetic circuit including an outer part of said ferromagnetic circuit which is formed with magnetic sheet metal sheets 6 with the individual permanent magnet parts 5a–5d contacting with their outer pole faces the sheets 6. The magnetic sheet metal sheets 6 are formed with bent portions at their lower ends as shown in FIGS. 2 and 3.

Instead of employing a prefabricated magnet support 4, in which the pole sleeve 7 is inserted with the individual permanent magnet parts 5a–5d, the pole sleeve with the individual magnets may also be coated or molded with plastic material so that this coating will form the magnet support. The coating or molding is carried out in such a way that the pole faces of the individual magnet parts 5a–5d remain open metallically so that they maintain metallic contact with the recessed portions of the sheet metal sheets 6 of the outer half circle in which they are inserted. When forming the magnet support 4 by means of coating as well as when employing a prefabricated magnet support 4, the pole sleeve 7 forms a structural unit with the individual magnets 5a–5d and the magnet support 4, providing an advantageous assembly. This unit is inserted in the sheet metal sheet 6 of the outer ferromagnetic circuit in a mold form in which the pulse coil is also supported on its coil body 10 and with its trip coil 8 and its drop coil 9, this structural assembly being then completed or complemented by means of the stopper 3 and the tubular core guide 2 which is slid into the magnet support 4 whereupon the parts which are thus combined are coated in common with plastic material. As a result, the plastic material coating 1 is thus formed.

If the magnet support 4, which is prefabricated from plastic material, and the pole sleeve with the individual magnets are assembled as individual parts, then this may be effected in that first the sheet metal sheets 6 and the pulse coil with its coil body 10 are inserted in a mold form, whereupon an auxiliary pin is introduced in the coil body, and in that the magnet support 4 is attached on the coil body 10, whereupon the pole sleeve 7 is inserted in the magnet support 4 and the four individual permanent magnet parts 5a–5d are inserted. Then, while removing the auxiliary pin, a structural assembly composed of the stopper 3, the tubular core guide 2, and a closing plate 11 is inserted and the entire unit is coated with plastic material to form the plastic material coating 1. As will be apparent to those skilled in the art from FIG. 1, the dimensioning relationships of standardized valves which do not have permanent magnet supports known in the art and the known arrangement of the individual elements by means of the arrangement of a permanent magnet ring, in accordance with the invention, on the lower end of the tubular core guide, in FIG. 3, need not be altered and the outer dimensioning and the total structural form may remain unchanged.

It is also possible to attach the permanent magnet at the other end of the tubular core guide member so that the guide member connects with the outer ferromagnetic circuit. This manner of construction, however, makes it necessary to change the grounding sheet metal 17.

Thus, in accordance with the invention it will be seen that an improvement is provided in that problems arising in the construction of known pulsed magnetic valves having permanent magnet support without change of remanence are overcome with respect to the dimensions, structural principles and total geometry, which change considerably relative to otherwise identical valves without permanent magnet support so that individual parts of a corresponding valve without magnetic support are not capable of being utilized for the otherwise identical valve with the magnet support. By contrast, the insertion of the permanent magnet in the outer ferromagnetic circuit makes it possible in such a manner that the normal configuration of a valve may be converted into the execution as pulsed magnetic valve with only slight changes. This is achieved in accordance with the present invention in that the permanent magnet is constructed with an annular shape, it is placed outside on one end of the tubular core guide member 2, and it is inserted in cutout portions C of the sheet metal sheets 6 which form the outer part of the ferromagnetic circuit.

A further development of the structure of the invention consists in that the permanent magnet is divided into several individual magnet parts 5a-5d which are placed on a pole sleeve 7. The pole sleeve 7, the individual magnet parts 5a-5d, and the magnet support 4, which is preferably injection molded from a plastic material, are then connected to form a unit while leaving open the pole faces of the individual magnet parts 5a-5d. In a valve assembly with only one switching position, the permanent magnet ring may also be attached at the other end of the tubular core guide 2 instead of at the one end, and in valves with two switching positions, an annularly shaped permanent magnet may be placed at each end of the tubular core guide member 2.

While specific embodiments of the invention have been shown and described in detail to illustrate the application of the inventive principles, it will be understood that the invention may be embodied otherwise without departing from such principles.

What is claimed is:

1. A pulsed magnetic valve assembly having permanent magnet support means with constant remanence comprising: valve means adapted to be electromagnetically operated and comprising a closure member; electromagnetically means for operating said valve means, said electromagnetic means including a movable core member associated with said closure member and a ferromagnetic circuit; permanent magnet means produced from a rare earth/cobalt alloy forming part of said ferromagnetic circuit; a tubular core guide member for guiding said movable core member; and a stopper member for limiting movement of said movable core member in one direction; said ferromagnetic circuit including sheet metal sheets forming an outer part of said ferromagnetic circuit with said movable core member forming an inner part of said ferromagnetic circuit; trip and drop coil means surrounding said guide member and generally enclosed by said sheet metal sheets; said sheet metal sheets having portions extending radially towards said movable core member, said radially extending portions being shaped to define cutouts located in a generally annular configuration around one end of said tubular core guide member, with said permanent magnet means being inserted into siad cutouts in contact with said radially extending portions in a manner to extend around said one end of said tubular core guide member in a generally annular configuration whereby the core member can be secured in a switched position by said permanent magnet means.

2. An assembly according to claim 1 wherein said permanent magnet means comprises a plurality of individual magnet parts, wherein said assembly further comprises a pole sleeve interposed between said individual magnet parts and said one end of said tubular core guide member, wherein said assembly further includes a magnet support formed of injection plastic molded material, with said individual magnet parts, said pole sleeve and said magnet support being joined together to form a unit arranged so as to leave exposed pole faces of said individual magnet parts for contacting said inwardly extending portions of said sheet metal sheets when inserted into said cutouts.

3. An assembly according to claim 2 wherein said permanent magnet means comprise four individual permanent magnet parts structured as small flat plates and arranged within said cutouts in said generally annular configuration.

* * * * *